(No Model.)
F. A. TAYLOR, P. W. FARRELL & W. S. QUEBE.
COACH OR CAR STEP.
No. 565,645.                     Patented Aug. 11, 1896.
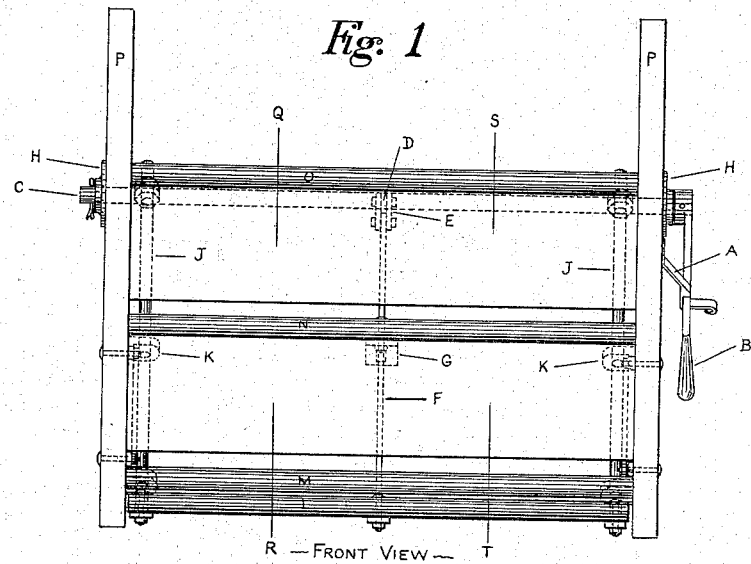
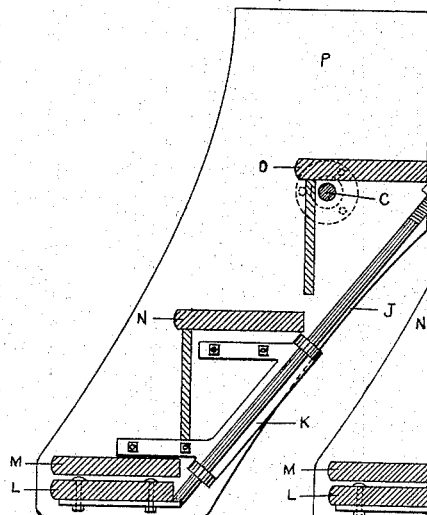
Witnesses                              Inventors

UNITED STATES PATENT OFFICE.

FREDERICK A. TAYLOR, PATRICK W. FARRELL, AND WESLEY S. QUEBE, OF GALVESTON, TEXAS.

COACH AND CAR STEP.

SPECIFICATION forming part of Letters Patent No. 565,645, dated August 11, 1896.

Application filed September 7, 1895. Serial No. 562,030. (No model.)

*To all whom it may concern:*

Be it known that we, FREDERICK A. TAYLOR, PATRICK W. FARRELL, and WESLEY S. QUEBE, citizens of the United States, residing at Galveston, in the county of Galveston, State of Texas, have invented a new and useful Improvement in Coach and Car Steps, of which the following is a specification.

Our invention relates to coach and car steps when an auxiliary step is needed and used in the extension of the main step whereby passengers getting off and on the car or coach have the use of an extra step.

The object of this invention is to render it unnecessary to carry stools or stepping-boxes, as are now used to facilitate passengers to get on or off the car or coach from an extra height between the ground or depot-floor and the main bottom tread of the step, thus avoiding dangerous and fatal results from overturning of stools and boxes. We attain these objects by the mechanism illustrated in the accompanying drawings, in which—

Figure 1 is a front view which shows the raising-rod C, toggle-joint E, arm D, sliding bar F, (for raising or lowering the tread,) sliding-bar guide G. H is a plate through which raising-rod C passes. J are sliding bars, and K are brackets through which they pass.
M is bottom tread of steps. L is movable tread. B is hand-lever, and A is the spring-catch which holds the lever in place when tread is up and not in use. P is the step sides. Fig. 2 is a section of Fig. 1 at Q R.
Fig. 3 is a section of Fig. 1 at S T, showing movable tread M, attached to sliding bar F, passing through guide G, toggle-joint E, and arm D. Fig. 4 is the end view of Fig. 1, showing hand-lever B, lever-catch A, rod-plate H, and step side P.

Similar letters refer to similar parts throughout the several views.

The movable tread L is attached to two sliding bars F, passing through brackets G, fastened to the side or string boards, (one on each.) The raising and lowering of this tread is done also by a sliding bar F, to which it is fastened on one end, and the other is attached to a toggle-joint E, which is attached to an arm D, that is movable and which is fastened to a rod C, passing through the step sides, on which there is a lever B on the outside end of rod. By this means the rod is turned and the tread L is raised or lowered. By recourse to the drawings this is fully explained.

What we do claim as our invention, and desire to secure by Letters Patent, is—

In combination, the step-frame with the stationary steps, the movable step L, the guide-bars J extending up at an angle from the ends of the movable step, the guides K on the step-frame for the two bars J, a central operating-rod F extending up at an angle, the guide G on one of the stationary steps for the bar F and the rock-shaft c with the arm D and toggle E connected with the bar F, the said operating-rod having sliding movement only in its guides, which is permitted by the lever-and-link connection, and the said rock-shaft being journaled in the corner of the step with the operating-arm D extending rearwardly therefrom, substantially as described.

F. A. TAYLOR.
P. W. FARRELL.
W. S. QUEBE.

Witnesses:
HENRY J. LABATT,
BRADFORD HANCOCK.